United States Patent [19]

Woolcock

[11] Patent Number: 4,868,917
[45] Date of Patent: Sep. 19, 1989

[54] RADAR ARRANGEMENTS

[75] Inventor: Sydney C. Woolcock, Wells, England

[73] Assignee: E M I Limited, Middlesex, England

[21] Appl. No.: 129,374

[22] Filed: Mar. 7, 1980

Related U.S. Application Data

[63] Continuation-in-part of Ser. No. 879,805, Feb. 17, 1978, abandoned.

[30] Foreign Application Priority Data

Feb. 22, 1977 [GB] United Kingdom ................ 7371/77

[51] Int. Cl.$^4$ .............................................. G01S 13/00
[52] U.S. Cl. ...................................... 342/26; 342/159; 342/192; 342/363; 342/365
[58] Field of Search ................ 343/5 SA, 5 W, 16 LS, 343/17.1 R, 100 PE; 342/192, 26, 155, 363, 365, 159

[56]  References Cited

U.S. PATENT DOCUMENTS

| | | | |
|---|---|---|---|
| 2,878,471 | 3/1959 | Butler | 343/756 |
| 3,031,661 | 4/1962 | Moeller et al. | 343/100 PE |
| 3,089,104 | 5/1963 | Allen | 343/756 |
| 3,453,617 | 7/1969 | Begeman et al. | 343/756 |
| 3,566,403 | 2/1971 | Hills | 343/5 R |
| 3,614,787 | 10/1971 | Hart | 343/100 PE |
| 3,893,117 | 7/1975 | Nirasawa | 343/7 A |
| 3,918,059 | 11/1975 | Adrian | 343/5 R |
| 4,005,425 | 1/1977 | Nagy | 343/100 PE |
| 4,008,472 | 2/1977 | Nirasawa | 343/171.1 R |
| 4,231,037 | 10/1980 | Long | 343/5 W |

OTHER PUBLICATIONS

Skolnik, *Intro. to Radar Systems*, McGraw-Hill, 1970, pp. 43-49, 547-551.
I. O. Olin et al., *Proc. of IEEE*, Aug. 1965.
I. M. Hunter, RRE Journal, Apr. 1955, pp. 1-38.

*Primary Examiner*—Stephen C. Buczinski
*Attorney, Agent, or Firm*—Fleit, Jacobson, Cohn, Price, Holman & Stern

[57] ABSTRACT

A radar apparatus transmits right circular polarized signals and selects the right circular polarized components of the corresponding returns. It also transmits left circular polarized signals and selects the left circular polarized components of the corresponding returns. The selected left and right circular polarized components are processed by, for example, averaging them, producing a weighted average of them, or selecting the component of larger value.

17 Claims, 7 Drawing Sheets

FIG. 1 L.L. POLARISATION

FIG. 2   R.R. POLARISATION

RADAR ARRANGEMENTS

This application is a continuation-in-part of application 879,805 of 17 February 1978, now abandoned.

The present invention relates to radar apparatus.

In some applications of radar it is important that clutter resulting from reflection from rain is rejected, and for this purpose it is known to use a circularly polarised transmission (Introduction to Radar Systems - Skolnik - McGraw-Hill).

It is also known that the magnitudes of radar signal as detected by a receiver after reflection from an object vary not only with the nature of the object but also with the type of polarisation transmitted and the type accepted by the receiver. (Introduction to Radar Systems - Skolnik - McGraw-Hill).

The inventor has discovered that, contrary to conventional expectations, transmission and reception of right circular polarisation produces with complex objects a different reflection from transmission and reception of left circular polarisation and so it is possible to have the advantages of polarisation diversity without loss of rain clutter rejection. By successively detecting signals received from an object due to transmission and reception of right circular polarised signals and the transmission of reception of left circular polarised signals and by suitably processing these two signals the detection and tracking of a target are improved.

According to the invention, there is provided a method of detecting a complex target with radar signals comprising the steps of:

(A) emitting radar signals with right circular polarisation applied to some of the signals and left circular polarisation applied to others of the signals;

(B) selecting the components having right circular polarisation of the returns corresponding to said some of the signals and selecting the components having left circular polarisation of the returns corresponding to said others of the signals; and (C) processing the selected components according to a predetermined relationship involving both the components having left circular polarisation and the components having right circular polarisation.

For a better understanding of the present invention, reference will now be made, by way of example, to the accompanying drawings, in which.

In this specification, the notations RR and LL have been used either as written here or as subscripts. In the notation, the first letter represents the sense of circular polarisation transmitted and the second letter the sense received. R means right circular polarisation and L means left circular polarisation. RR and LL may be termed "rain or sphere reject mode" being a mode of operation of polarization which fails to receive echoes from spheres e.g. rain drops see "Introduction to Radar Systems" - M.I. Skolnik - Section 12.7.

Reflections from most air, land, and seaborne manmade vehicles are very complex. For example, scattering from an aircraft is in part due to reflections from the mouth and cavity of intake ducts, from aerials and bulkheads and from cockpits. For each of these types of complex reflector, multiple reflections take place at each reflector. For example, the incident illumination may firstly strike the bulkhead on which a dish aerial is mounted, then the back of the dish aerial and finally the inside of a radome enclosing the aerial before a significant component of the illumination is directed towards the radar apparatus. In accordance with the inventors discovery, the reflections for transmission and reception of right circular polarisation RR are likely to be different in such a situation from the reflections for LL.

Figure 1:
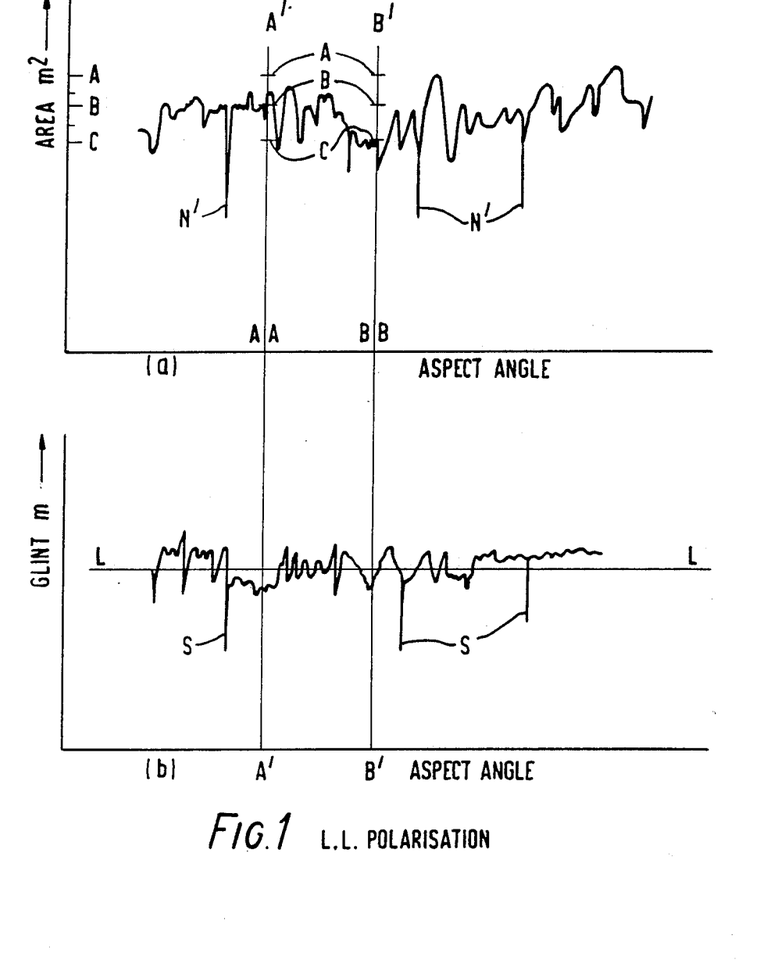
FIG. 1 shows illustrative patterns of variation of radar cross-section and glint for left circular polarisation.
Figure 2:
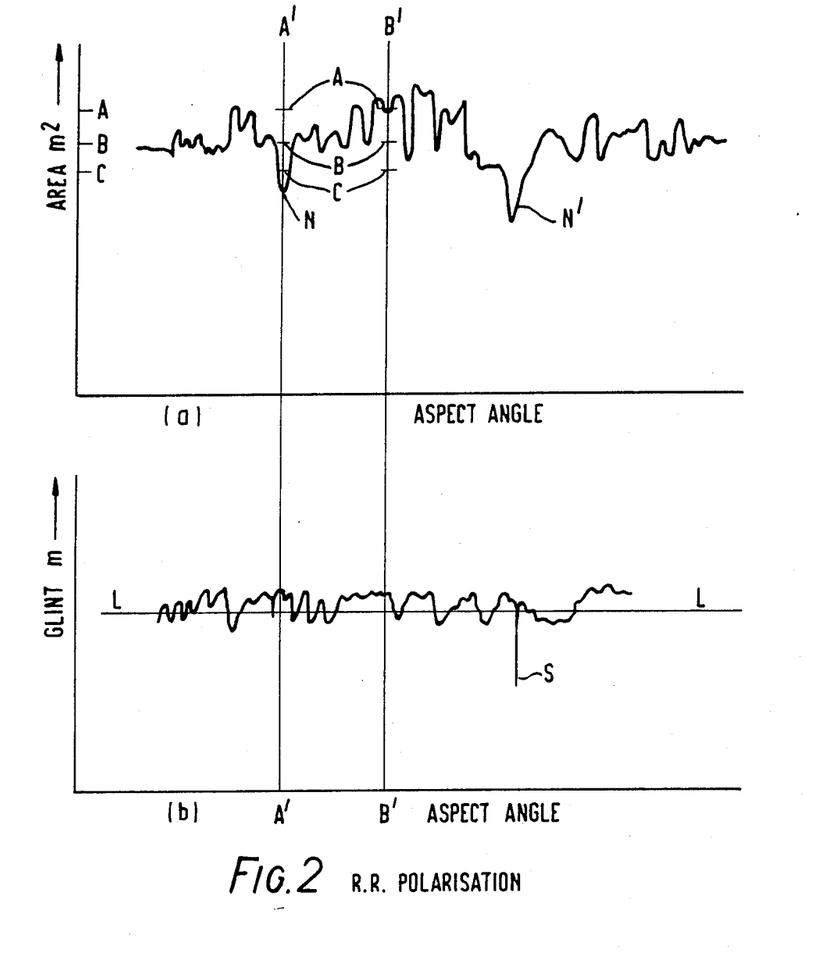
FIG. 2 shows the same for right circular polarisation.

Practical results were obtained by the inventor in an experiment using scale modelling measurements. In the experiment, a model of an aircraft was suspended at fixed aspect while a model phase radar was moved around it to vary the aspect in a precise manner. The experiment enabled the magnitude of the return and the glint (i.e. the offset of the radar centre of the aircraft from its physical centre) to be determined over the azimuthal range 10 deg. to 35 deg. from head-on using initially LL polarization, subsequently RR polarisation and finally LL polarisation again. FIGS. 1 and 2 show the general form of portions of typical results. (The figures have been drawn for the purposes of illustration only and do not show actual results but are nevertheless representative of such results. Referring to FIGS. 1a and 2a, the magnitude of the radar return (expressed as a radar echo area in units of $m^2$) varies with aspect for both RR and LL polarisations. Referring to FIGS. 1b and 2b, the results show that the glint i.e. the distance between the radar and physical centres, expressed in terms of distance in units of m also varies by several metres about the local mean value represented by line LL. Occasionally, the radar centre passes outside the target silhouette, as indicated by occasional large glint spikes S (which are rare and of little interest).

Comparing FIGS. 1a and 2a it will be seen that at any specified angle, the magnitude of the reflections using RR and LL polarisations are often very different as shown for example at line BB. In particular a null at one angle, e.g. A 'A', for, say, RR polarisation in FIG. 2a (which in a real situation could result in a detection failure at that aspect angle) is often not present with LL polarisation (c.f. FIG. 1a at angle A 'A').

Comparing FIG. 1b with FIG. 2b it will be seen that the glints of LL and RR polarisations at the same aspect are different. Comparison of the first LL polarisation FIG. 1b result with the second LL polarisation result (not shown) showed that the significant glint was the same in each experiment. Consequently the series of experiments has shown that there are real differences in the LL and RR polarisation results. Since there is a lack of correlation between the RR and LL signals then at any target aspect one of these will give signals of larger amplitude than the other.

It can be seen from FIGS. 1 and 2 that when the glint error is large the signal amplitude is small and hence to attach greater significance to the signal of larger amplitude will enhance detectivity and reduce tracking error.

Thus, in a preferred embodiment in accordance with the present invention, the illumination of a target with RR polarisation and LL polarisation and the suitable processing of the returns associated with the two polarisations, can be used to improve detection of a target and improve tracking of a target. The processing may take various forms. One form is averaging signals derived from RR and LL polarisation returns, to improve detection. In consequence of the lack of correspondence of the nulls of the signal magnitude for LL and RR polarisations and the fact that a large glint error is often associated with an amplitude null, some averaging or weighting of the glint directions determined for the respective polarisations, or, alternatively, some preprocessing of the signals obtained with RR and LL polarisations prior to determining the target direction in the receiver, can be used to improve radar tracking accuracy.

Figure 3:
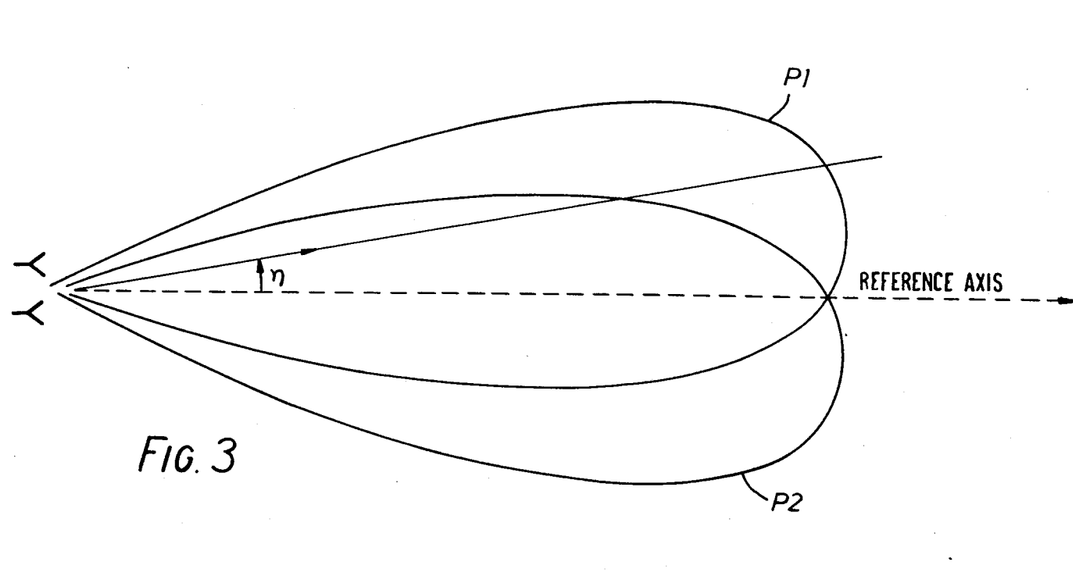
FIG. 3 is an aerial polar diagram of a single-plane sequential lobing radar.

There will now be described with reference to FIGS. 3 to 8 an example of a tracking radar apparatus embodying the invention. The apparatus shown in FIGS. 3 to 8 is a single-plane sequential lobing radar, FIG. 3 showing a polar representation of the antenna main beam in two alternative positions P1 and P2. In the lobing radar, the beam is alternately switched between these positions. If the target direction does not coincide with the reference axis, the amplitude of echo signals received from the target associated with the two positions of aerial beam will differ.

The magnitude of the difference is proportional to the angular displacement n of the target from the reference axis, and the sign of the difference indicates the direction in which the antenna of the radar must be moved in order to align the reference axis with the target. When the amplitudes of returns in the two positions are equal, the reference axis is aligned with the target.

Figure 4:
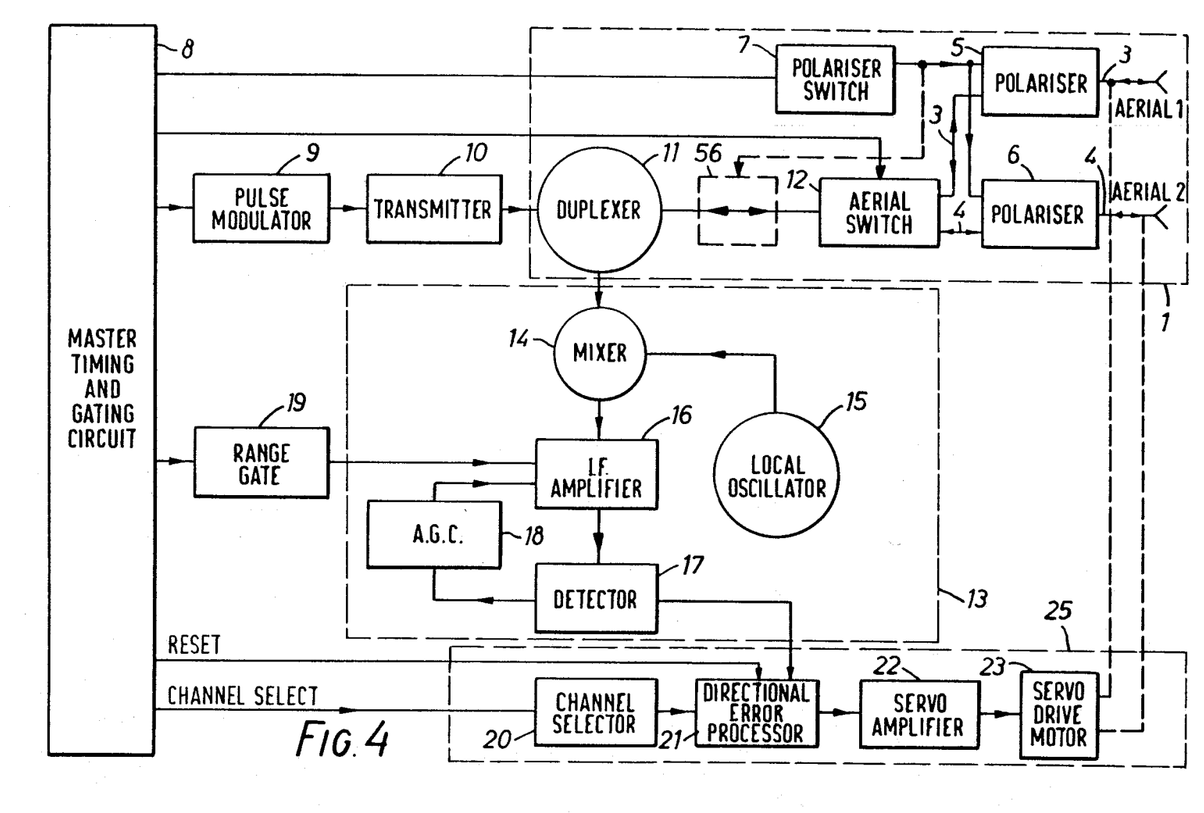
FIG. 4 is a block diagram of a single-plane sequential lobing radar embodying the invention.

Referring to FIGS. 3 and 4 the radar has two aerials 1 and 2 and two waveguides 3 and 4 for feeding radar pulses to the aerials. Polarisers 5 and 6 are arranged in the waveguides. The sense of polarisation of the polarisers 5 and 6 is controlled by a polariser switch 7, which is controlled by a master tuning and gating circuit 8 so that the polarisers are set to the RR and LL modes alternately. The circuit 8 also controls a pulse modulator 9 which causes a transmitter 10 to emit the radar pulses which are fed via a duplexer 11 and an aerial switch 12 to the waveguides 3 and 4. The duplexer protects a receiver 13 of the radar from the high power transmitter radar pulses and feeds the low power returns to the receiver. The aerial switch is controlled by the circuit 8 to connect the duplexer to the waveguides 3 and 4 alternately, in a time relationship to the operation of the polariser switch 7 to be described hereinafter with reference to FIG. 5.

The receiver 13 is a heterodyne receiver in which the radar returns are mixed in a mixer 14 with a signal from a local oscillator 15 to produce intermediate frequency signals which are amplified in an I.F. amplifier 16 and fed to a detector 17. A range gate 19 controlled by the circuit 8 switches the amplifier on and off at preset times in relation to the transmission of the radar pulses so that only returns from a preset range are detected.

An automatic gain control 18 is provided to normalise the signals produced by the detector. In effect, the automatic gain control divides the values of the amplitudes of the signal echoes received by the receiver by a value which is an average value of the amplitudes over an averaging time period which is long relative to the pulse repetition period. For instance the pulse repetition period may be ½ ms to ¼ ms (i.e. a repetition frequency of 2 to 4 kHz) whereas the averaging period might be 0.1s. This achieves two functions, amongst the other things:

(1) It normalises the returns due to the RR and LL polarisations thus achieving some of the processing required for operation of this example of invention; and (2) It compensates for variations in amplitude of the returns with range of the target thus preventing saturation of the receiver by large signals.

The normalising of the RR and LL polarisation returns is inherent in the normal operation of the conventional A.G.C. circuit 18.

The receiver feeds the normalised returns to a tracking arrangement 25, in which a channel selector 20, again controlled by the circuit 8, controls an error processor 21 and a switch 26 to process normalised returns selected from the two aerials in a manner described hereinafter with reference to FIG. 8 so as to provide the best estimate of the aerial pointing error. A servo amplifier 22 and a servo drive motor 23 drive the aerials in dependence upon the determination made by the error processor 21 to align the reference axis of the aerials with the target.

Figure 5:
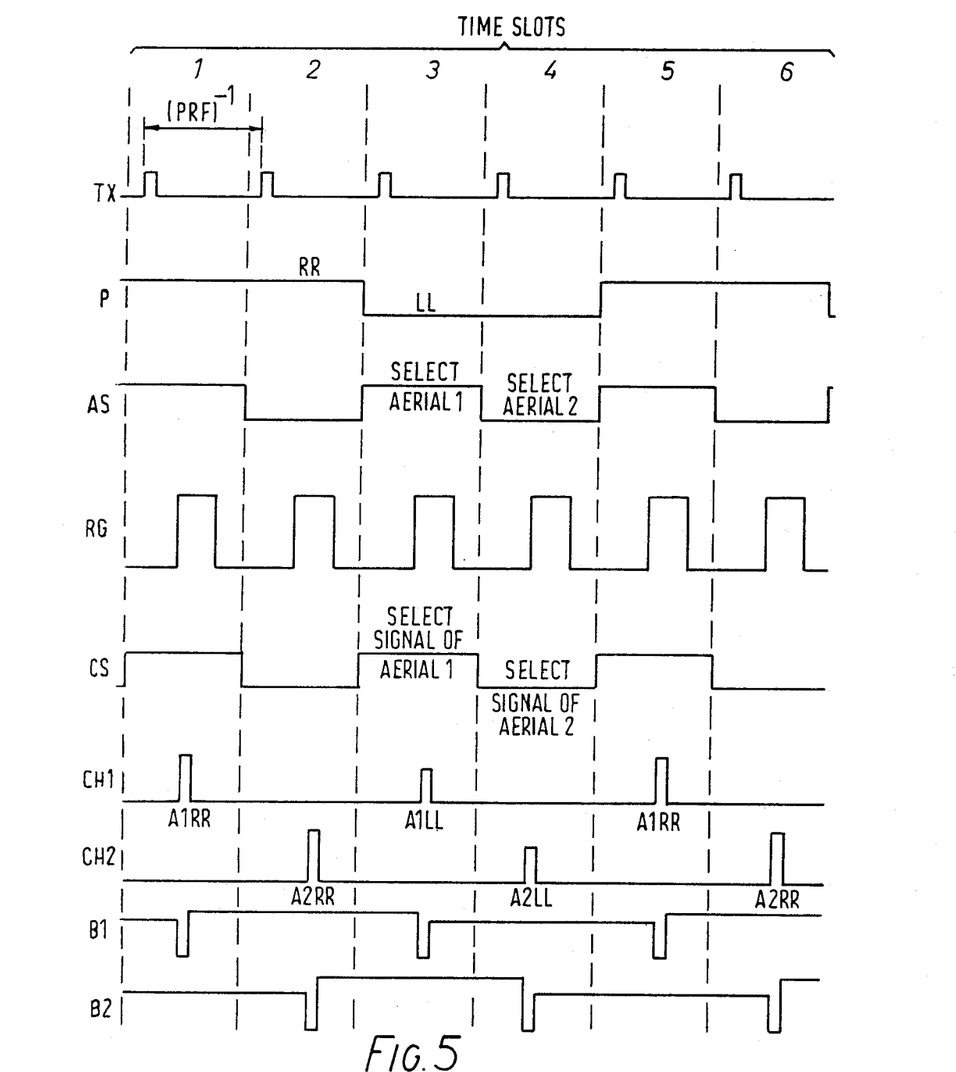
FIG. 5 shows timing waveforms illustrating the operation of the radar of FIG. 4.

The timing of the operation of the radar is shown in FIG. 5.

As indicated by TX, pulses are regularly transmitted by the transmitter 10 as controlled by circuit 8 and modulator 9 in a succession of time slots of which some, 1 to 6, are shown. As indicated by line AS the aerials 1 and 2 are selected by the aerial switch 12 in alternate time slots; for example aerial 1 is selected in slot 1, and aerial 2 in slot 2. The polarisers 3 and 4 are both set to the same polarisation, right circular polarisation being selected for two successive time slots (e.g. 1 and 2) and left circular polarisation for the next two (e.g. 3 and 4). Thus in time slot 1, aerial 1 transmits and receives with right circular polarisation (RR) and in time slot 2 aerial 2 operates in the RR mode. In line slot 3 aerial 1 operates in LL mode and in line slot 4 aerial 2 operates in LL mode.

Signals received when the range gate 19 is open (as indicated by RG in FIG. 5) are detected and normalised according to the long term average of preceding signals in the receiver 13 and fed to the tracking arrangement 25.

Figure 8:
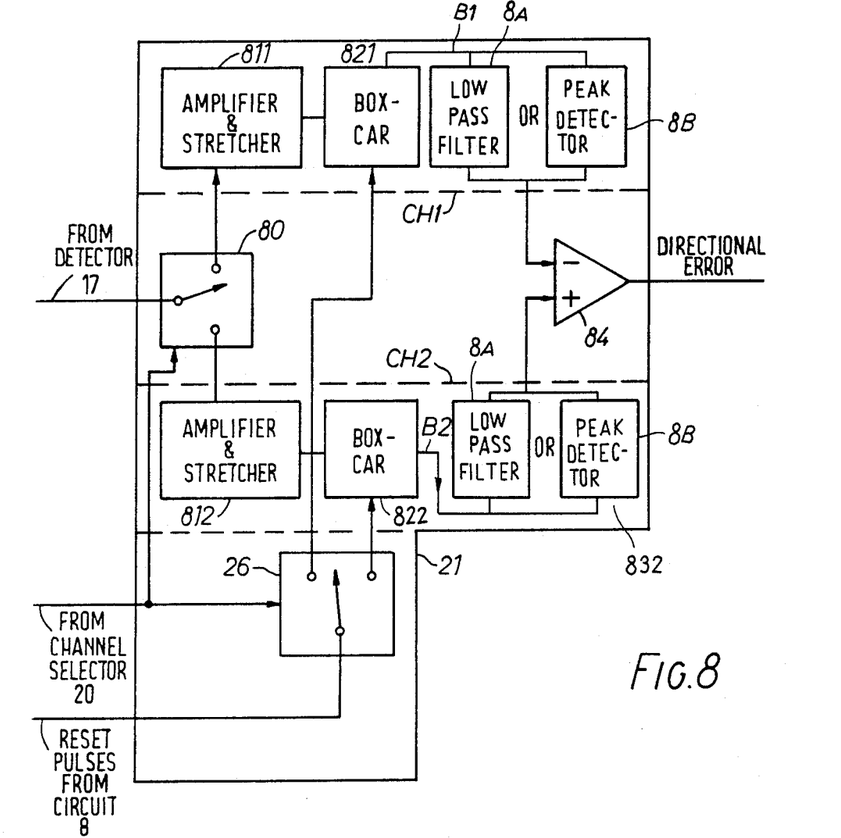
FIG. 8 shows in more detail a signal processor of the radar of FIG. 4.

FIG. 8 shows examples of the directional error processor of FIG. 4, and FIG. 5 illustrates its operation. The processor comprises two channels CH1 and CH2 associated with the aerials 1 and 2 respectively. Signals received from the detector 17 are fed to a channel selecting switch 80 which is operated by the channel selector 20 to select channel CH1 when aerial 1 is selected and channel CH2 when aerial 2 is selected, as indicated by lines CS and AS in FIG. 5. Each channel comprises an amplifier and stretcher circuit, a boxcar circuit and a further circuit numbered respectively 811, 821 and 831 for channel one and 812, 822 and 832 for channel two. As indicated by FIGS. 8A and 8B the further circuit may be a low pass filter or a peak detector. The outputs of the channels CH1 and CH2 are fed to a differencing amplifier 84 where a signal representing the directional error is produced. The boxcar generators receive resetting signals from the circuit 8 via the switch 26, which is controlled to select the channels by the channel selector 20.

Referring to FIG. 5 CH1, CH2 it is evident that during time slot 1 channel 1 receives a signal A1RR which is a RR signal from aerial 1, and during time slot 3 it receives a signal A1LL which is an LL signal from aerial 1. During time slot 2 channel 2 receives a signal A2RR which is an RR signal from aerial 2 and during time slot 4 it receives a signal A2LL which is an LL signal from aerial 2. These signals are amplified and stretched by the circuits 811, 812, 821 and 822 to produce the signals B1 at the output of the boxcar circuit 821 and B2 at the output of the boxcar circuit 822.

If the further circuits comprise low pass filters (A), the output of the channels are signals representing the average of the corresponding RR and LL signals of their associated aerials.

If the further circuits to comprise peak detectors (B), the output of the channels represent the larger of the corresponding RR and LL returns of the associated aerials.

The differencing circuit 84 substracts the outputs of the channels to determine the directional error.

Figure 6:
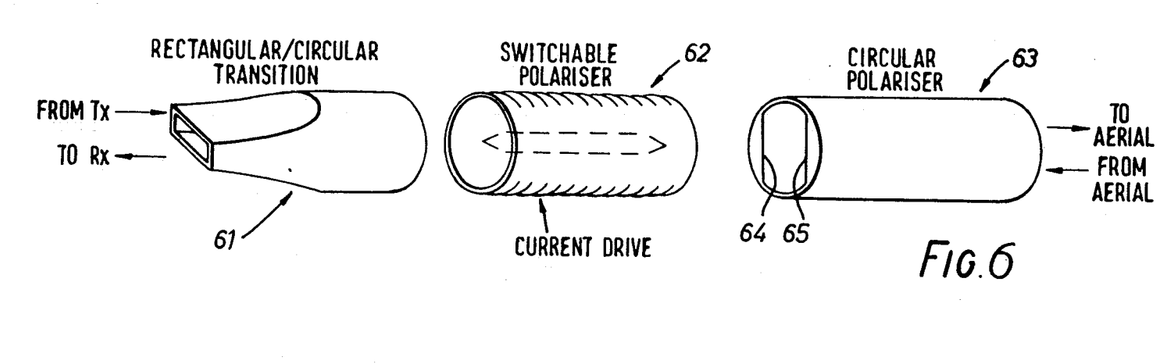
FIG. 6 illustrates an arrangement for achieving switched circular polarisation in a waveguide structure.

FIG. 6 illustrates an example of an arrangement for achieving switched circular polarisation using a waveguide structure and which may be used as the polariser 5 or 6 of FIG. 4. Other arrangements are possible using a waveguide or another type of transmission line. The device illustrated is shown in 'exploded' form in the figure so that the functioning of its components can be more easily explained.

Power from the transmitter source (not shown) is incident, via a rectangular to circular waveguide transformer 61, onto a Faraday rotator 62. This element includes a ferrite rod positioned at the centre of a length of a circular waveguide. A coil of wire surrounds the waveguide so that an axial magnetic field can be applied to the rod by means of a drive current. The purpose of the device is to rotate the incident field quickly over an angle of 45 deg. clockwise or anticlockwise according to the direction of the applied current. The use of a ferrite rod to achieve rotation of the polarisation of a guided electro-magnetic wave is well known e.g. Van Trier, Guided Electromagnetic Waves in Anisotropic Media, Applied Science Research, Vol. B3, P305, 1953.

The guided wave is next incident on a circular polariser 63. The form illustrated is constructed from circular waveguide with two plates 64, 65, inserted as illustrated, so that the guide width is different in the horizontal and vertical principal planes. The incident E vector at 45 deg. to the broad face of a plate can be resolved into two equal components having E vectors and at right angles to the plate. The operation of the device is to introduce a phase delay of 90 deg. to one component so that the emergent components are in time and space quadrature i.e. the wave is circularly polarised. The hand of polarisation can be reversed by rotating the E vector incident on the polariser through 90 deg.

Figure 7:
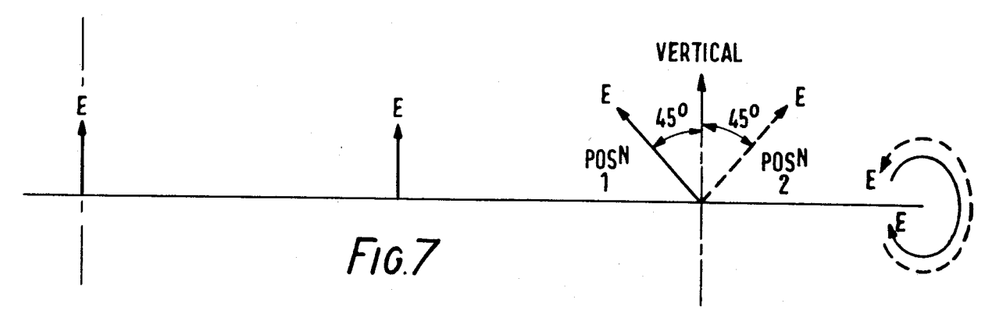
FIG. 7 is a diagram illustrating the operation of the arrangement of FIG. 6.

FIG. 7 is a vector diagram illustrative of the field vectors obtaining at the parts of the arrangement of FIG. 1 beneath which they are aligned.

The radar described hereinbefore with reference to FIGS. 4 to 7 has been described by way of example only. It may be modified in various ways for example: The radar of FIG. 4 comprises two polarisers in the feeds to the respective aerials 1 and 2 between the aerial switch 12 and the aerials. These two polarisers could be replaced by a single polariser 56 arranged between the duplexer 11 and the switch 12, as shown by dotted block 56 in FIG. 4.

The radar of FIG. 4 tracks in a single-plane e.g. either azimuthally or elevationally. If tracking in two planes e.g. azimuthally and elevationally is required at least one further aerial and associated feed is required, to produce two beams in each of two orthogonal planes. In practice four aerials and feeds would be used.

Two aerials and feeds would be associated with polarisers or a polariser, aerial switch, duplexer, receiver and tracking arrangement for tracking in azimuth as shown by blocks 1', 13 and 25 in FIG. 4. The other two aerials would be associated with duplicates of those items for tracking in elevation. The timing circuit 8, modulator 9 and transmitter 11 could be common to all four aerials.

Furthermore, although an application of the invention has been illustrated with reference to a sequential-lobing radar, it is to be appreciated that the invention can be incorporated in many other types of pulsed radar, for example amplitude-comparison monopulse radar, phase-comparison monopulse radar, conical scan radar, and pulsed Doppler radar. In these radars, polarisers are arranged in the feeds to the aerials and the pulses are transmitted and received with RR and LL polarisations in time-multiplex fashion, and the returns suitably processed. The invention can also be incorporated in a continuous-wave radar by applying RR and LL polarisations to the wave in time-multiplex fashion and suitably processing the returns.

Figure 9:
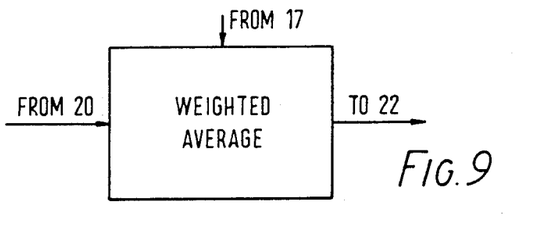
FIG. 9 shows an alternative form of the processor.

There has been described with reference to FIGS. 4, 5 and 8 two exemplary ways of processing the RR and LL signals; i.e. averaging and choosing the greater of two signals. These and other techniques of processing the signals are well known to those skilled in the art. An example of another technique is weighted averaging as shown in FIG. 9.

An application of the radar according to the invention is to arrangements for guidance systems applicable to relatively small guided missiles. In order that such missiles are effective, they should be guided towards the target with high accuracy so that there is a high probability of the target being actually struck thereby. If radar tracking is used for guidance of such missiles then strict demands are made upon transmitter modulation and received processing techniques to achieve this accuracy. The operating wavelength of the radar may be reduced e.g. so that the radar itself can be made smaller and hence cheaper to transport. The radar polarisation has then to be circular in order to minimise clutter resulting from reflection from rain. With a radar according to the invention (i) it is possible to have polarisation diversity in a circularly polarised radar system without loss or rain clutter rejection (ii) such diversity is achievable, in a pulse system for example, by time multiplexing right-circular transmission/right-circular reception (RR polarisation) with LL polarisation (iii) this polarisation diversity can be achieved easily and that there are various means of processing the two received signals, e.g. those resulting from use of RR and LL polarisations in order to achieve significant improved tracking accuracy, and improved detection.

What I claim is:

1. A method of detecting a complex target with radar signals comprising the steps of:

(A) emitting radar signals with right circular polarisation applied to some of the signals and left circular polarisation applied to others of the signals;

(B) selecting the components having right circular polarisation of the returns corresponding to said some of the signals and selecting the components having left circular polarisation of the returns corresponding to said others of the signals; and (C) processing the selected components according to a predetermined relationship involving both the components having left circular polarisation and the components having right circular polarisation.

2. A method according to claim 1, wherein the signals are radar pulses.

3. A method according to claim 1 or 2, wherein the processing comprises forming the average of said components having right and left circular polarisation.

4. A method according to claim 1 or 2, wherein the processing comprises forming a weighted average of the said components having right and left circular polarisation.

5. A method according to claim 1 or 2, wherein the processing comprises selecting that one of corresponding components having right and left circular polarisation which has the greater value.

6. A radar apparatus comprising means for producing radar signals, means for emitting the signals with right circular polarisation applied to some of the signals and left circular polarisation applied to others of the signals and for selecting the components having right circular polarisation of the returns corresponding to said some of the signals and the components having left circular polarisation of the returns corresponding to said others of the signals, and means for processing the selected components to produce a signal dependent on a predetermined relationship involving the selected left and right circular polarisation components.

7. Apparatus according to claim 6, wherein the emitting means is adapted to emit said some and other signals alternately.

8. Apparatus according to claim 6 or 7, wherein the emitting means comprises antenna means for emitting the signals and receiving the corresponding returns, and polarising means connected to feed the radar signals from the producing means to the antenna means and adapted to apply right circular polarisation to said some of the signals and to select the components of the corresponding returns having right circular polarisation, and to apply left circular polarisation to said others of the signals and to select the components of the corresponding returns having left circular polarisation.

9. Apparatus according to claim 8, wherein the antenna means comprises first and second antennas, and the polarising means comprises first and second polarisers connected to the respective antennas, switching means for selectively connecting the polarisers to the producing means, and means for controlling the polarisations of the polarisers.

10. Apparatus according to claim 6 or 7 wherein the said signal produced by the processing means is dependent on the average of the selected components.

11. Apparatus according to claim 6 or 7 wherein the said signal produced by the processing means is dependent on a weighted average of the selected components.

12. Apparatus according to claim 6 or 7 wherein the said signal produced by the processing means is dependent on that one of corresponding components having right and left circular polarisation which has the greater value.

13. In a radar apparatus comprising:

means for producing radar signals, antenna means for emitting the radar signals and receiving corresponding returns, and receiving means;

the improvement comprising:

polarising means arranged to apply right circular polarisation to some of the emitted signals and to select the components of the corresponding returns having right circular polarisation, and to apply left circular polarisation to others of the emitted signals and to select the components of the corresponding returns having left circular polarisation, and a processor for processing the selected components in a manner involving both the said components having left circular polarisation and the components having right circular polarisation which relate to substantially the same target zone.

14. Apparatus according to claim 13, wherein the polarising means is adapted to apply the right and left circular polarisations to the signals alternately.

15. Apparatus according to claim 13 or 14 wherein the processor forms the average of the selected components having right and left circular polarisation which relate to substantially the same target zone.

16. Apparatus according to claim 13 or 14, wherein the processor forms a weighted average of the selected components having right and left circular polarisation which relate to substantially the same target zone.

17. Apparatus according to claim 13 or 14, wherein the processor selects that one of the selected components having right and left circular polarisation which relate to substantially the same target zone which has the greater value.

* * * * *